Oct. 13, 1953
N. A. MERRITT
2,655,331
CHRISTMAS TREE SUPPORT
Filed Dec. 10, 1951
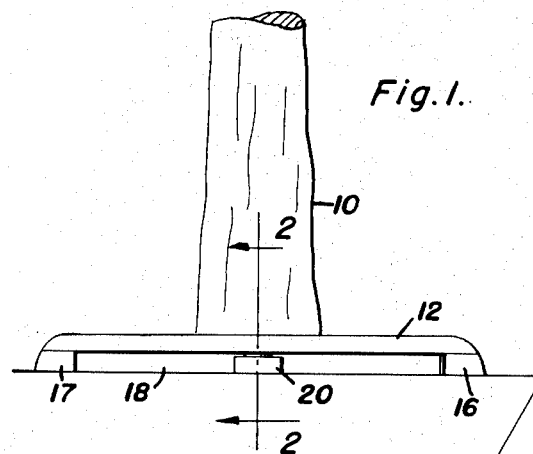
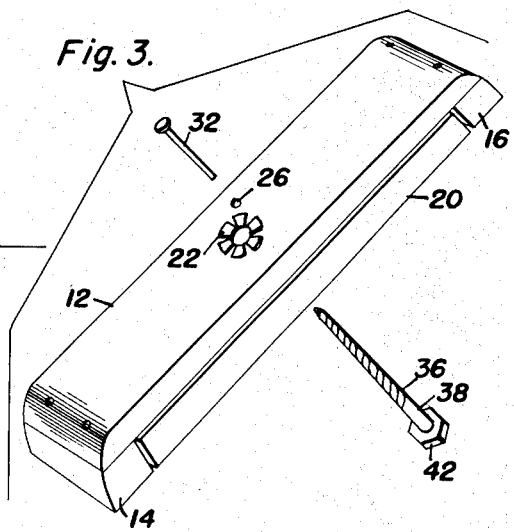
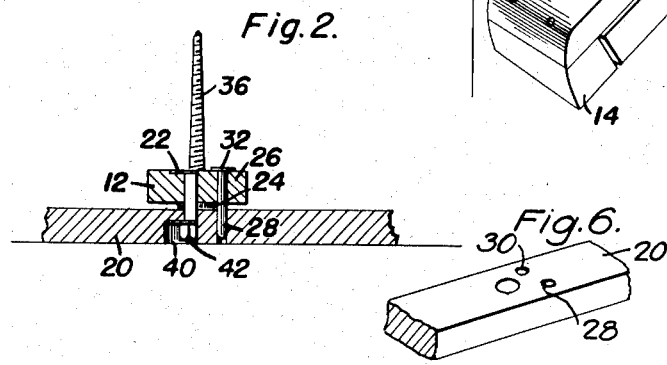
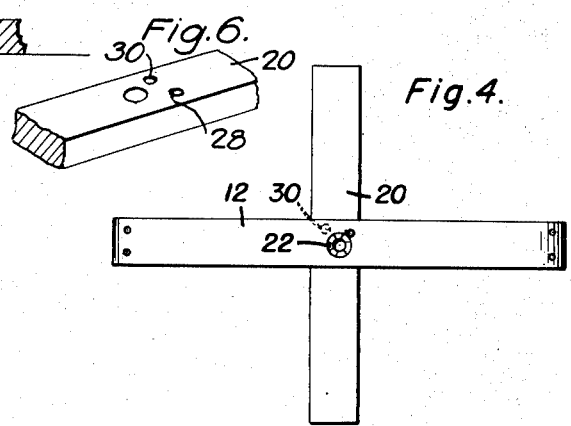
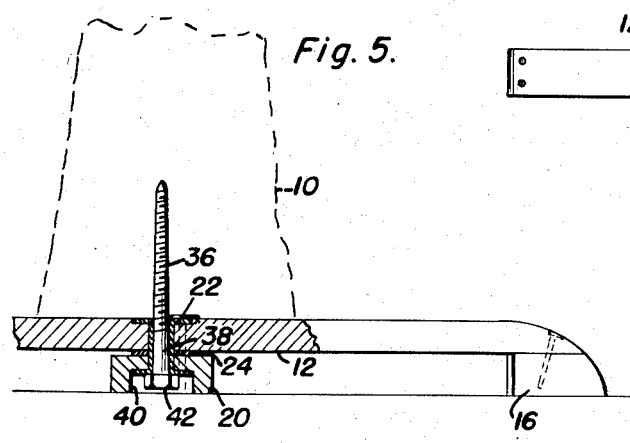
Norman A. Merritt
INVENTOR.
BY
*Attorneys*

Patented Oct. 13, 1953

2,655,331

UNITED STATES PATENT OFFICE 2,655,331

CHRISTMAS TREE SUPPORT

Norman A. Merritt, Wilmington, N. C.

Application December 10, 1951, Serial No. 260,890

1 Claim. (Cl. 248—46)

This invention relates to a Christmas tree support and particularly to a supporting structure which can be either folded or extended and locked in either position.

In the utilization of Christmas trees or other ornamental trees it is desirable to have a support therefor of sufficiently large base area to properly support the tree in upright position during normal use. Since trees and such like structures are relatively heavy and of considerable length, a large base structure is therefore necessary. On the other hand, it is desirable to have a relatively small structure or a structure that can be folded so that it can be shipped in relatively small space.

The present invention provides a tree support which has a foldable base which can be folded into alignment to take a minimum of shipping space or extended into cruciform arrangement to provide a base of large supporting area. A locking pin is arranged to lock the base structure in either its folded or expanded condition.

It is therefore an object of this invention to provide an improved tree support.

It is a further object of this invention to provide a folding tree support.

It is a further object of this invention to provide a tree support which can be locked in either extended or folded position.

Other objects and many of the attendant advantages will be apparent from the following description taken in conjunction with the accompanying drawings in which:

Figure 1 is an elevation of the tree support;

Figure 2 is an enlarged section showing the locking mechanism therefor;

Figure 3 is a perspective partially exploded view showing the component parts of the invention;

Figure 4 is a top plan view of the tree support;

Figure 5 is an enlarged section showing the pivot and screw arrangement; and,

Figure 6 is a perspective view of a portion of the tree support showing the locking holes.

In the exemplary embodiment a tree 10 is mounted on a support having a longitudinal top member 12 provided with feet 14 and 16 adjacent the ends thereof, the feet 14 and 16 providing a recess 18 on the underside of the top elongated member 12. An elongated bottom member 20 is arranged to extend into the recess 18 and is pivotally connected to the upper member 12 by means of a hollow rivet 22.

The member 20 is sufficiently shorter than the recess 18 so that it may freely rotate about the pivot 22 so that it may be moved either into alignment with the upper member 12 or in transverse position thereto.

In order to permit free rotating motion between the members 12 and 20 a spacing member 24 is interposed between the members 12 and 20 and preferably in the form of a washer mounted on the pivot 22.

To provide a substantially rigid base, it is very desirable to lock the members 12 and 20 in their relative cruciform position when the tree is in position thereon, and to lock them in aligned position when they are in condition for shipment or storage.

In order to provide positive locking between the members 12 and 20 the member 12 has been provided with a bore 26 and the member 20 has been provided with a pair of bores 28 and 30. The bore 28 is so positioned that when the members 12 and 20 are arranged in proper cruciform position the bores 26 and 28 are in alignment and a locking member 32 may extend through the bores 26 and 28 rigidly securing the members in cruciform position so there will be no tendency for the base to fold up and allow the tree to be upset. Likewise, the bore 30 is arranged so that when the members 12 and 20 are in folded or aligned position, the member 32 may go through the bores 26 and 30 and lock the members in aligned position for storage or shipment.

To secure the support to a tree or other upright extending device, a tapered screw 36 is provided which has a portion or shank 38 journaled in the hollow rivet 22 while the member 20 is provided with a counterbore 40 receiving a head 42 of the screw 36. In order to mount the tree 10 on the foldable stand the screw 36 extends through and is journaled in the pivot 22 and is screwed into the base of the tree element 10 which is preferably substantially level or smooth on the base end for cooperation with the top surface of the member 12. For a like reason the top edge or end of the rivet 22 is countersunk into the member 12 so that there is a relatively smooth surface to support the bottom end of the tree trunk.

It will thus be seen that the present invention provides a support which may be folded into a minimum of space for shipment or storage and yet expanded and locked in rigid position to provide a base of large area for supporting an upright device such as a Christmas tree.

While for the purpose of exemplification a particular embodiment of the invention has been shown and described according to the best present understanding thereof, it will be apparent to those skilled in the art that many changes can be made therein without departing from the true spirit of the invention.

Having thus described the invention, what is claimed as new is:

A Christmas tree holder comprising an upper elongated member, feet members adjacent the ends of said upper member, said feet defining a recess at the underside of said upper member, a lower elongated member received in said recess, said members each having a transverse bore substantially midway between the ends thereof, a counterbore at the lower surface of said lower member, a tubular pivot pin secured in said transverse bores, a spacing member interposed between said upper and lower members, a locking bore in said upper member parallel to and spaced from said pivot, a pair of bores in said lower member, one bore of said pairs of bores being in alignment with the locking bore of the upper member when said members are arranged in alignment, the other bore of said pair of bores being in alignment when said members are arranged transverse to each other, a pin engaging said locking bore in said upper member and selectively engaging one of the bores of said pair of bores to selectively lock said members in predetermined arrangement, a tapered screw mounted in said tubular pivot pin, the head of said screw being received in said counterbore.

NORMAN A. MERRITT.

References Cited in the file of this patent

UNITED STATES PATENTS

| Number | Name | Date |
|---|---|---|
| 923,206 | Singleton | June 1, 1909 |
| 952,655 | Wagner | Mar. 22, 1910 |
| 981,631 | Fraser | Jan. 17, 1911 |
| 2,070,882 | Brown | Feb. 16, 1937 |
| 2,444,390 | White | June 29, 1948 |
| 2,505,723 | Rees | Apr. 25, 1950 |